United States Patent [19] [11] Patent Number: 4,668,242
Vitellaro et al. [45] Date of Patent: May 26, 1987

[54] PROCESS FOR PRODUCING GRANULATED POTASSIUM SULPHATE AND POTASSIUM MAGNESIUM SULPHATES, AND THE GRANULATES OBTAINED THEREBY

[75] Inventors: Antonio Vitellaro; Giovanni Sanfilippo, both of Palermo, Italy

[73] Assignee: Italkali Societa Italiana Sali Alcalini S.p.A., Palermo, Italy

[21] Appl. No.: 702,624

[22] Filed: Feb. 19, 1985

[30] Foreign Application Priority Data

Jun. 19, 1984 [IT] Italy ................. 21488 A/84

[51] Int. Cl.[4] ............... C05B 19/00; C22B 1/14; C05G 3/00
[52] U.S. Cl. .................. 23/313 R; 71/61; 71/64.05; 71/64.13
[58] Field of Search ............ 23/313 R; 71/61, 64.04, 71/64.06, 64.08, 64.13, 64.05

[56] References Cited

U.S. PATENT DOCUMENTS

| | | | |
|---|---|---|---|
| 2,979,421 | 4/1961 | Rissman et al. | 71/64.13 X |
| 3,231,413 | 1/1966 | Berquin | 71/64.13 X |
| 3,501,282 | 3/1970 | Titus | 71/64.04 X |
| 3,853,490 | 12/1974 | Boeglin et al. | 71/64.13 X |
| 3,923,489 | 12/1975 | Richardson | 71/64.03 X |
| 3,979,198 | 9/1976 | Bardsley | 71/63 X |
| 4,081,266 | 3/1978 | MacKinnon | 71/64.08 X |
| 4,183,738 | 1/1980 | Carmon | 71/61 X |
| 4,277,253 | 7/1981 | Walter et al. | 71/64.05 X |

Primary Examiner—David L. Lacey
Attorney, Agent, or Firm—Morgan & Finnegan

[57] ABSTRACT

The invention relates to a process for preparing granulated potassium sulphate or potassium magnesium sulphate, characterized by comprising the following steps:
(a) grinding the potassium sulphate or potassium magnesium sulphate
(b) mixing the ground product of step (a) with a corresponding unground sulphate until a predetermined particle size distribution curve is obtained
(c) treating the mixture of step (b) with a hot, saturated solution of a corresponding sulphate until a wet paste is obtained, and the final further steps of granulating said paste and drying the granulate thus obtained. The invention also relates to the products obtained in this manner.

5 Claims, 1 Drawing Figure

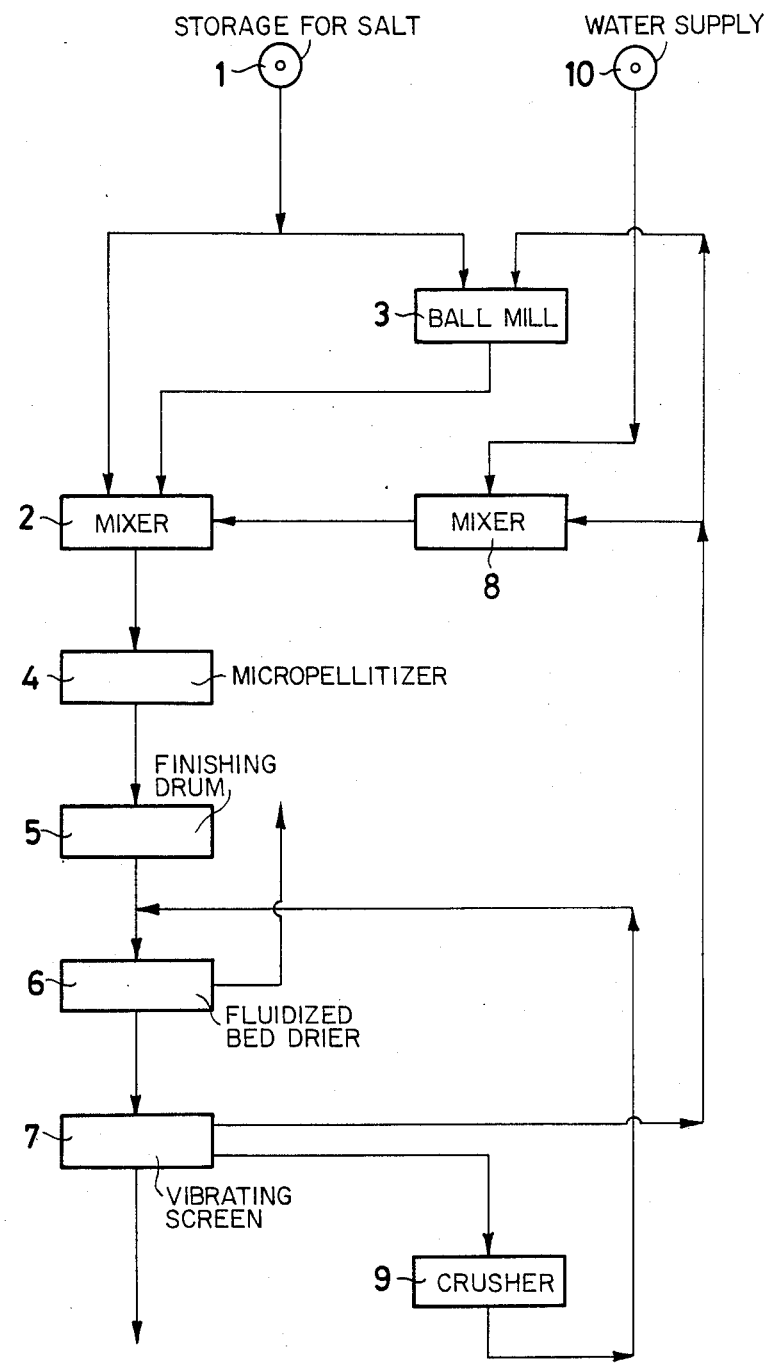

PROCESS FOR PRODUCING GRANULATED POTASSIUM SULPHATE AND POTASSIUM MAGNESIUM SULPHATES, AND THE GRANULATES OBTAINED THEREBY

This invention relates to a process for preparing granulated potassium sulphate and potassium magnesium sulphates. Particularly in the fertilizer sector, the tendency of farmers to favor fertilizer mixtures which are able to satisfy all the different soil and crop requirements by employing suitable products requires the increasingly widespread availability of individual nutrient components (based on potassium, nitrogen and phosphorus) in the form of granules which are approximately similar to each other in terms of dimensions and visual characteristics, so that the composite fertilizer obtained by mixing does not lack homogeneousness. No natural process is currently known for preparing simple granular potassium-based compounds. Products are, however, known in which the salt is formulated together with binders, which have the drawback of lowering the concentration in the granulate, besides obviously increasing production costs. It is also known to produce a brecciated product by a costly process comprising a material compression stage. In particular, the finished product deriving therefrom has properties inferior to those of a granulate. The object of the present invention is to provide a process which in a simple and economical manner produces a potassium granulate as such, free from additives, which has the required hardness and compression and abrasion resistance characteristics. These and further objects are attained according to the invention by a process for preparing granulated potassium sulphate or potassium magnesium sulphate, characterised by comprising the following steps:

(a) grinding the potassium sulphate or potassium magnesium sulphate (b) mixing the ground product of step (a) with a corresponding unground sulphate until a predetermined particle size distribution curve is obtained.

(c) treating the mixture of step (b) with a hot, saturated solution of a corresponding sulphate until a wet paste is obtained, and the final further steps of granulating said paste and drying the granulate thus obtained.

The process according to the invention is described hereinafter by way of example with reference to the accompanying drawing, the single FIGURE of which shows a block diagram thereof. In this diagram, each block represents one stage of the system employed to perform the process. According to this diagram, the process comprises in general the following operational stages in combination and succession:

(a) the potassium sulphate originating from storage 1 is divided into two streams of which one goes to the processing stage 2 and the other, together with material originating from the processing stage 7, goes to the processing stage 3 where it is ground in a ball mill and reduced to a very fine powder.

(b) The product originating from the processing stage 3, mixed with that originating directly from storage 1, passes to the processing stage 2, where it is wetted, to a water content of 9%, with a high-temperature saturated solution of potassium sulphate originating from stage 8, and mixed until a perfectly homogeneous mass is obtained. The processing stage 8 is fed with water originating from 10.

(c) The product originating from the processing stage 2 passes to the processing stage 4 where a coarse formation of potassium sulphate granules is produced in a micropelletizer, and then passes to the processing stage 5 where these granules reach their required shape and dimensions in a finishing drum.

(d) The product originating from the processing stage 5 is dried in a fluidized bed drier 6 and is then riddled in a vibrating screen 7 in order to obtain: a product with a particle size distribution of between 2 and 5 mm, which represents the finished product; a fraction with a particle size of less than 2 mm which is recycled partly to the processing stage 8 and serves for preparing the saturated potassium sulphate solution, and partly to the processing stage 3; and a fraction with a particle size of greater than 5 mm which is fed to a crusher 9 and then, after being reduced to a particle size distribution mainly of between 2 and 5 mm, to the fluidized bed drier 6 where it is further dried.

The process according to the invention is illustrated hereinafter by means of a non-limiting numerical example. Of 10 tons per hour (t/h) of potassium sulphate, originating from storage 1 and having the following average particle size distribution:

|   |      |        |
|---|------|--------|
| < 35       | mesh | 2.33%  |
| 35 < 48    | mesh | 0.33%  |
| 48 < 100   | mesh | 19.00% |
| 100 < 150  | mesh | 28.00% |
| 150 < 200  | mesh | 26.33% |
| 200 < 270  | mesh | 14.33% |
| < 270      | mesh | 9.67%, |

6 t/h go to the processing stage 2 and 4 t/h, together with 2 t/h of material originating from the processing stage 7, go to the processing stage 3 from which 6 t/h of a product are obtained having the following average particle size distribution:

|   |      |     |
|---|------|-----|
| < 150     | mesh | 8%  |
| 150 < 200 | mesh | 12% |
| 200 < 270 | mesh | 15% |
| 270 < 400 | mesh | 15% |
| < 400     | mesh | 50% | which pass to the processing stage 2. From this processing stage, 13.3 t/h of wet paste are obtained containing 9% of water. The wet paste is then granulated in stage 4 to obtain a granulate having the following particle size distribution:

|   |      |        |
|---|------|--------|
| < 35       | mesh | 1.16%  |
| 35 < 48    | mesh | 0.16%  |
| 48 < 100   | mesh | 9.50%  |
| 100 < 150  | mesh | 18.00% |
| 150 < 200  | mesh | 19.17% |
| 200 < 270  | mesh | 14.67% |
| 270 < 400  | mesh | 12.34% |
| < 400      | mesh | 25.00% |

The wet paste, which has been well mixed in the processing stage 2, passes to the processing stages 4 and 5 and then to 6, from which 13.9 t/h of dry material are obtained.

The dry material originating from the processing stage 6 passes to the processing stage 7, from which 10 t/h of product with a particle size distribution of between 2 and 5 mm, 2.2 t/h of a fraction with a particle size of less than 2 mm, and 1.7 t/h of a fraction with a particle size of greater than 5 mm are obtained.

Of the 2.2 t/h of the fraction with a particle size of less than 2 mm, 0.2 t/h pass to the processing stage 8 and 2 t/h to the processing stage 3.

1.7 t/h of the fraction with the particle size greater than 5 mm pass to the processing stage 9, from which 1.7 t/h are obtained with a particle size distribution mainly of between 2 and 5 mm, this being returned to the processing stage 6.

The product obtained from this processing has the following characteristics:

| | |
|---|---|
| Packing resistance | 100 g/cm$^2$ |
| Hardness | 630 g/granule of 10 mesh |
| Frictional resistance | between 7 and 15% passing at 1 mm. |

From the aforegoing description and example, it can be seen that the process of the invention attains the initially proposed objects.

We claim:

1. A process for preparing a potassium granulate which is free from additives and has a particle size distribution of between 2 and 5 mm, said granulate selected from the group consisting of granulated potassium sulphate and potassium magnesium sulphate, said process comprising the following steps:
    (a) grinding a salt selected from the group consisting of potassium sulphate and potassium magnesium sulphate to obtain a ground product having the following average particle size distribution: less than about 150 mesh, about 8%; 150 to about 200 mesh, about 12%; 200 to about 270 mesh, about 15%; 270 to about 400 mesh, about 15%; and greater than 400 mesh, about 50%;
    (b) mixing the ground product of step (a) with a corresponding unground salt selected from the group consisting of potassium sulphate and potassium magnesium sulphate until a predetermined particle size distribution is obtained for the mixture;
    (c) treating the mixture of step (b) with a hot, saturated solution of a corresponding salt selected from the group consisting of potassium sulphate and potassium magnesium sulphate until a wet paste is obtained;
    (d) granulating said paste to obtain a granulate having the following average particle size distribution: less than about 35 mesh, about 1.16%; 35 to about 48 mesh, about 0.16%; 48 to about 100 mesh, about 9.50%; 100 to about 150 mesh, about 18%; 150 to about 200 mesh, about 19.17%; 200 to about 270 mesh, about 14.67%; 270 to about 400 mesh, about 12.34%; and greater than 400 mesh, about 25%; and
    (e) drying the granulate thus obtained.

2. A process as claimed in claim 1, further including:
    after said granulating step (d) and before said drying step (e), subjecting the granulate leaving step (d) to a finishing procedure to obtain a required granulate shape and size; and
    after said drying step (e), classifying the dried granulate to give rise to fractions of predetermined particle size distribution, of which at least one constitutes a final potassium granulate product, the remaining fractions including an oversized fraction and a fine fraction, the oversized fraction being sent to a crusher stage, the material from the crusher stage and the fine fraction being recycled to points upstream of step (e).

3. A process as claimed in claim 1, wherein at least part of the saturated solution of said step (c) is prepared by using at least part of the dried granulate of step 3).

4. A potassium granulate selected from the group consisting of granulated potassium sulphate and potassium magnesium sulphate, obtained by the process claimed in claim 1.

5. The potassium granulate of claim 4 which has a packing resistance of about 100 g/cm$^2$, a hardness of about 630 g/granule of 10 mesh and a frictional resistance of between 7 and 15% passing at 1 mm.

* * * * *